UNITED STATES PATENT OFFICE.

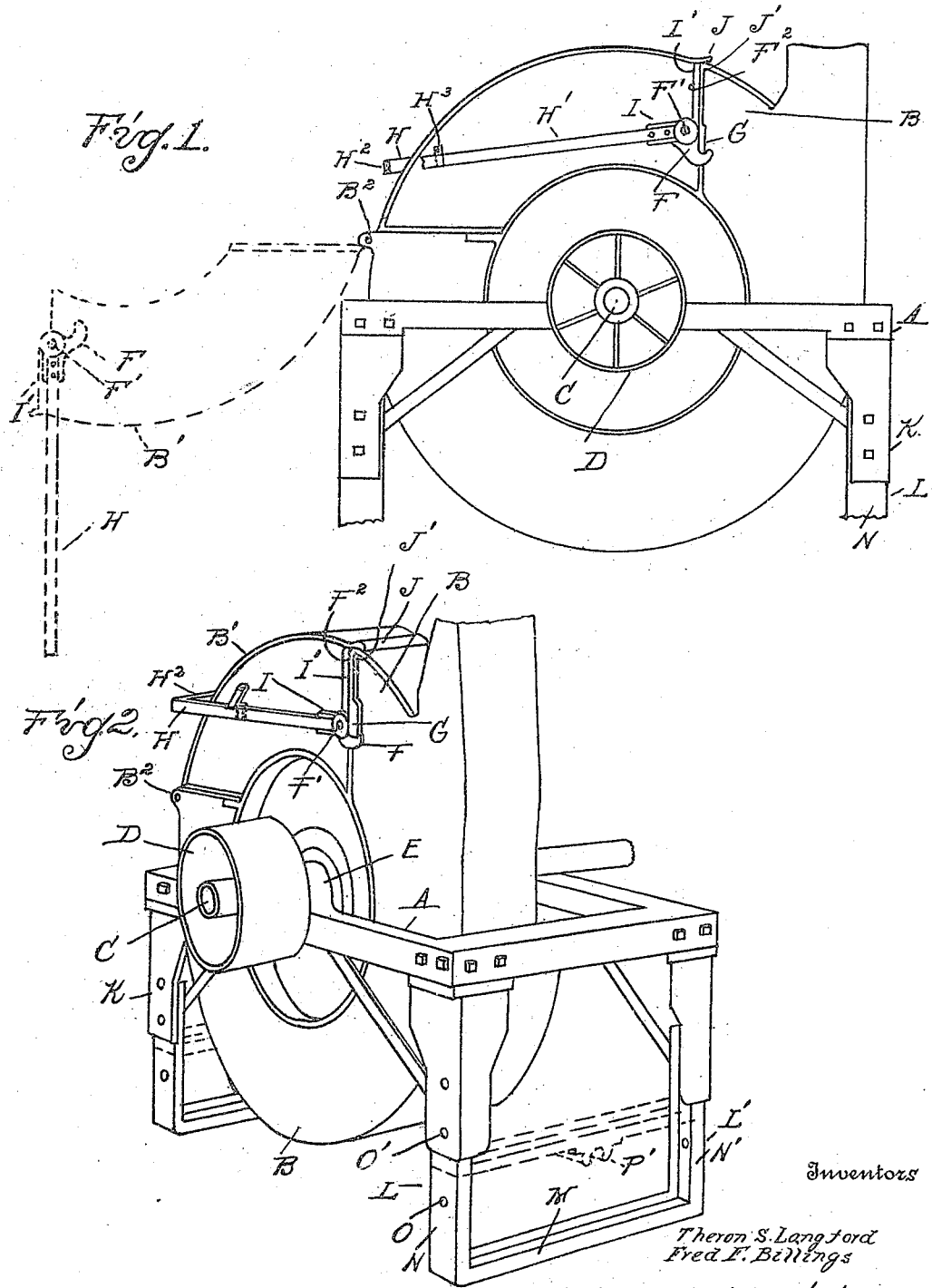

THERON S. LANGFORD AND FRED F. BILLINGS, OF ANN ARBOR, MICHIGAN, ASSIGNORS TO ANN ARBOR MACHINE CO., OF ANN ARBOR, MICHIGAN, A CORPORATION OF MICHIGAN.

CASING FOR SILO-FILLERS.

1,234,353. Specification of Letters Patent. Patented July 24, 1917.

Application filed September 13, 1916. Serial No. 119,961.

*To all whom it may concern:*

Be it known that we, THERON S. LANGFORD and FRED F. BILLINGS, both citizens of the United States of America, residing at Ann Arbor, in the county of Washtenaw and State of Michigan, have invented certain new and useful Improvements in Casings for Silo-Fillers, of which the following is a specification, reference being had therein to the accompanying drawings.

This invention relates to silo fillers or other ensilage cutters and refers more particularly to an improved housing or casing for devices of this general character.

One of the objects of the invention is to provide a combined locking device and stand for the removable part of the air housing. Another object of the invention is to so arrange the supporting mechanism for the frame that it can be used for both stationary and portable mountings. The invention also resides in such details of construction and arrangements and combinations of parts as will more fully hereinafter appear.

In the drawings:

Figure 1 is a side elevational view of a silo filler embodying our invention;

Fig. 2 is a perspective view of the mechanism shown in Fig. 1.

In detail, A designates the frame which supports the housing B of the ensilage cutter. The fan wheel within the housing is driven from a shaft C upon which is mounted the usual drive wheel D, this shaft being secured in bearings E on the frame A.

In order to conveniently get at the interior parts of the housing, the latter is provided with a removable section B' which is hinged to the main part of the housing at B². It is necessary that the two sections of the housing be locked in tight contact when the cutter is in operation and the present invention contemplates a novel arrangement wherein by the operation of a single member, the section B' can be unlocked from the main part of the housing and rocked about its pivot B² to the inoperative position shown in dotted lines in Fig. 1. In detail this locking mechanism comprises two hooks or similar devices F which are attached to the section B' by pivots F' having a common axis parallel to the main shaft C. The hooks F are so constructed and positioned as to project beyond the edge F² of the section B' and engage with lugs G attached to the stationary section B of the housing. For operating the hooks we preferably provide a pair of operating rods H and H' connected at their outer ends by a transverse portion H² so as to form a U-shaped loop or bail passing outside of the edges of the housing so that the operator by taking hold of the end portion H² can lift the loop or bail. This will rock the hooks F about the pivot and release them from the lugs G, after which the operator using the loop or bail as a handle can rock the section B' backward to the position shown in dotted lines.

The loop or bail member serves the further function of supporting the section B' in its inoperative position, and to prevent the loop from passing beyond the position shown in dotted lines, the hooks F are provided with projections I which strike against the rim or raised edges I' of the housing. Thus the loop section forms the triple function of a lever for rocking the hooks into and out of locking engagement, as a handle for lifting the removable section, and third, as a supporting leg for the section B' when in its inoperative position. The section B' has a lip or projecting portion J which extends over the edge J' of the stationary section, this lip being preferably sufficiently resilient so that it will be placed under tension when the hooks F are engaged with the lugs G. This feature in connection with the long leverage provided for operating the locking mechanism insures a tight connection and a secure locking engagement between the two sections. If desired the loop end of the handle could be locked down by a catch such as H³.

For supporting the frame A the latter is provided with four short legs K attached thereto at the four corners of the frame. These legs are of a lesser length than is necessary to support the housing off from the ground and are provided with pairs of extensions L and L'. Each pair of the latter is formed of a horizontal bed piece M with upwardly extending ends N and N', these ends having a plurality of holes O while the leg sections K are also provided with a plurality of bolt holes O'. When the cutter is to be used with a stationary mounting, the extensions are in the position shown in full lines in Fig. 2, in this position each of the extensions forming a support for one end of the machine. The extra holes are provided in the legs and extensions so that the latter may be raised and secured in the position shown in dotted lines of Fig. 2 when the machine is to have a portable mounting. In this upper position there is sufficient clearance above the ground to admit an axle and wheel to be placed beneath the extensions, the axle extending lengthwise of the frame and being held in place by suitable axle hangers P′.

What we claim as our invention is:

1. The combination with a housing having a main section and a movable section pivoted thereto, of means for locking said sections together comprising a locking member and a member for actuating said locking member arranged to serve as a handle for moving said section.

2. The combination with a housing having a main section and a movable section pivoted thereto, of means for locking said sections together comprising a locking member and a member for actuating said locking member arranged to serve as a handle for moving said section, and as a supporting leg for said section in its open position.

3. The combination with a housing comprising a main section and a movable section pivoted thereto, of a pair of hooks pivoted to said movable section, lugs on the stationary section engaged by said hooks and a loop or bail for simultaneously releasing said hooks from said lugs.

4. The combination with a housing comprising a main section and a movable section pivoted thereto, locking members on opposite sides of said movable section for locking the latter to said main section, and a member for simultaneously operating said locking members.

In testimony whereof we affix our signatures.

THERON S. LANGFORD.
FRED F. BILLINGS.

Copies of this patent may be obtained for five cents each, by addressing the "Commissioner of Patents, Washington, D. C."